Feb. 3, 1959 B. WALKER 2,872,209
CABLE CONNECTED AUXILIARY VEHICLE SUSPENSION
Filed May 11, 1954
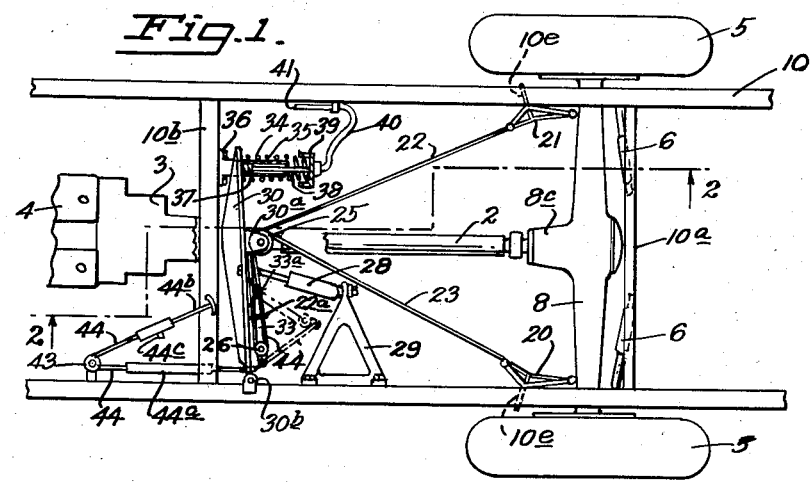
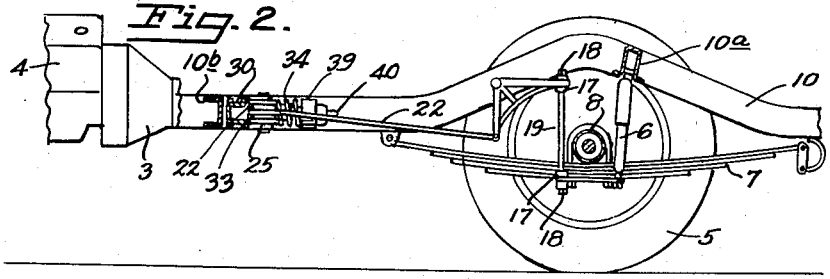
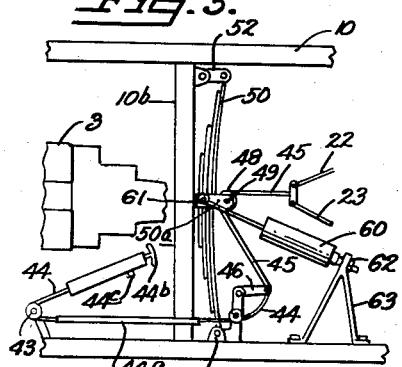
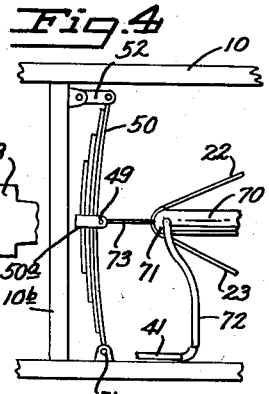
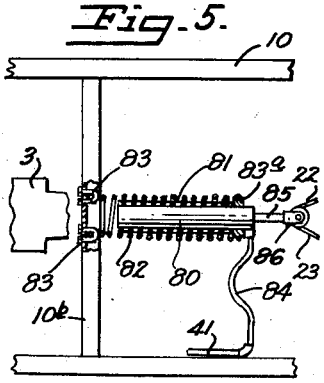
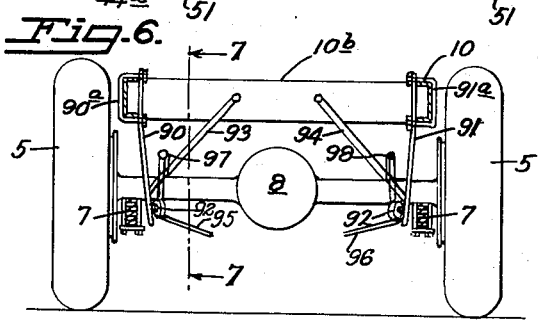
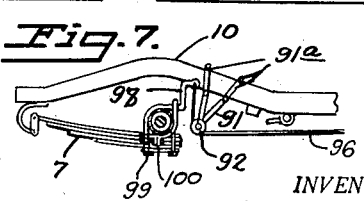
INVENTOR.
Brooks Walker

United States Patent Office 2,872,209
Patented Feb. 3, 1959

2,872,209

CABLE CONNECTED AUXILIARY VEHICLE SUSPENSION

Brooks Walker, Piedmont, Calif.

Application May 11, 1954, Serial No. 429,019

15 Claims. (Cl. 280—124)

This invention pertains to improvements in overload springs and auxiliary vehicle suspensions, to take care of varying loads in vehicles and the like.

One object of the invention is to provide a spring rate that is correct for the vehicle when it is lightly loaded, such as a front seat load in a pickup, station wagon, bus, sedan, truck, etc., and have under the control of the driver auxiliary springs that can be brought into effective support before or after a heavier load of passengers or cargo is loaded in the vehicle.

My United States Patent No. 2,518,733, entitled "Auxiliary Vehicle Suspension," shows one form of such overload spring. Where I have used or will use the word "spring," I wish it to be understood that it is to cover any type of spring, resilient material, pneumatic cylinder or bag tube or container that will provide resilient support.

An object of the invention is to provide a single spring to act as overload and sway stabilizer for two vehicle wheels, when said spring is mounted for fore and aft motion in load carrying.

An object of the invention is to provide manual, hydraulic, or power means for engaging and loading the overload springs, of the type disclosed.

Another object is to provide greatly increased mechanical leverage in manually loading said overload spring as the load on the spring increases over the leverage effective when starting to load said overload spring, when said spring is mounted for fore and aft motion when carrying a load. Another object of the invention is to provide a construction in which a single coil spring in compression may act as an overload spring for two vehicle wheels.

Another object is to provide a construction whereby a single coil spring in tension can act as an overload spring for two vehicle wheels.

Another object of the invention is to provide a horizontal overload spring acting on the rear wheels through bell cranks to transfer vertical wheel motion to horizontal overload spring motion.

Another object is to provide cables over pulleys from the wheel supports to a horizontal spring to engage and disengage the overload spring.

Another object is to provide an overload spring and shock absorber that supplements the spring support and adds to the shock absorber resistance when the overload is in the active operating position.

Another object of the invention is to provide a construction whereby a horizontal leaf spring supported on the vehicle frame or body can act as overload spring for two of the vehicle support wheels.

Another object is to provide a construction whereby a transverse leaf spring can be attached to the wheel supporting structure, disengaged, or varying degrees of load carried by said transverse leaf spring at a given wheel center to frame distance.

Another object is to provide a construction whereby compression resilient means may be located ahead or at the rear of the rear wheel supporting structure and made effective or ineffective by being connected or disconnected to said rear wheel supporting structure by cable or other means to carry varying degrees of overload for a given clearance between the center of said vehicle wheels and the vehicle frame.

Other objects of the invention will be more particularly pointed out in the accompanying specifications and claims.

I have illustrated my invention by way of example in the accompanying drawings, in which:

Fig. 1 is a plan view partly cut away showing one form of the invention.

Fig. 2 is a side elevation partly cut way taken at section 2—2 of Fig. 1.

Fig. 3 is a plan view partly cut away of another form of the invention.

Fig. 4 is a plan view partly cut away showing another form of the invention.

Fig. 5 is a plan view partly cut away showing another form of the invention.

Fig. 6 is an end elevation view looking toward the rear wheels with a section taken just ahead of the rear wheels and shows another form of the invention.

Fig. 7 is a reduced scale side elevation taken at section 7—7 of Fig. 6.

On all figures like numerals of reference refer to corresponding parts.

In Figs. 1 and 2 I have shown a vehicle frame 10 with supporting rear wheels 5, a rear axle 8, a rear cross member 10a which supports the upper ends of telescoping shock absorbers 6 in the conventional manner. Rear springs 7 provide the support for the rear of the vehicle at the correct rate for a good ride when the vehicle is lightly loaded. The vehicle is driven by engine 4, transmission 3 and drive shaft 2. A pinion housing 8c supports the pinion and the rear of the drive shaft. Bell cranks 20 and 21 are pivoted in angle mounted bearings 10e that extend through frame 10 (see Fig. 1). Bell cranks 20 and 21 are connected to axle 8 by links 19 having rubber mounted ends like shock absorber links with rubbers 17 at each end and nuts 18 to retain them. Cable 22 is connected to bell crank 21 while cable 23 is connected to bell crank 20. The forward end of cables 22 and 23 passes around double pulleys 25. Pulleys 25 are mounted on bracket 30a on arm 30. Arm 30 is pivoted to frame 10 at 30b. At the other end of arm 30 is mounted a compression spring 34 within which is a hydraulic cylinder 35 secured to frame cross member 10b by bolts 36. Piston 37 is secured to hollow piston rod 38 which it attached to spring retainer 39 and flexible hose 40. Hose 40 is connected to line 41 which goes to a manual pump or power steering pump in a manner similar to that described in my copending U. S. patent applications Nos. 394,244 and 405,920. Arm 33 is pivoted to arm 30 at pivot pin 33a. Arm 33, is actuated by cable 44, and carries pulley 26 which supports the cable loop which joins cables 22 and 23. Cable 44 is actuated by hand control handle 44b similar to an emergency brake. Ratchet pawl 44c holds the handle out in any desired position and turning the handle releases the ratchet pawl 44c. Pulley 43 turns cable 44 before entering flexible guide 44a. By this means when handle 44b is first pulled, arm 33 starts rotating clockwise from the dotted-line position to its solid-line position, as viewed and shown in Fig. 1. The arm 33 then begins tightening the overload cables 22 and 23. By moving the pulley 26 farther from the pulley 25 as the pulley 26 moves from its dotted-line position to its solid-line position, as shown in Fig. 1. Near the outer end of the stroke of handle 44b the leverage in tightening cables 22 and 23 is greatly increased as arm 33 approaches (but does not reach) dead center relative to cables 22 and 23. A cable clamp 22a can be used to make cables 22 and 23 move together to give more sway stabilizing control if desired. I have also shown the hydraulic cylinder 35 to tighten the overload spring 34 after hand control 44b has been tightened. Though both hydraulic and manual controls are shown, either one can be used alone, or to use them independently the hydraulic should be tightened before using the manual. If the hydraulic is to be used alone, the manual should be tightened first. If the hydraulic is to be used without the manual, cables 22 and 23 could be anchored to arm 30 near where pulley 25 is located.

When the overload is operating, the effective rate on the rear suspension will be increased and a heavier shock absorber resistance is desirable. Therefore, I have provided shock absorber 28 of the type used in front end coil springs. One end of the shock absorber 28 is attached to arm 30 and the other to bracket 29 through the usual rubber-like flexible end connections.

In operation, the vehicle frame 10 is supported for light loads on its wheels 5 by its usual shock absorbers 6 and springs 7. When heavier loads are added, the overload suspension is brought into play, either hydraulically or manually. Manual operation is initiated by pulling the handle 44b, so that the cable 44 moves the arm 33 about its pivot pin 33a, carrying with it its pulley 26. This movement tightens the cables 22 and 23 and brings the overload spring 34 into play. Hydraulic operation is initiated by charging the cylinder 35, thereby tightening the spring 34.

In Fig. 3 I have shown a portion of a vehicle frame 10 in which the cross member 10b supports a shackle 52 for overload leaf spring 50, the other end of the spring being bearinged at 51 which is secured to the vehicle frame. At the center of the spring a pulley 48 is attached by pin 49 to yoke 50a at the center of spring 50. Handle 44b through link 46 and cable 44 actuates the manual tightening mechanism to tighten cable 45 which in turn tightens overload cables 22 and 23 which may be attached to bell cranks, as was shown in connection with Figs. 1 and 2. Where it is desirable to add a shock absorber resistance to the added overload spring, a shock absorber 60 may be mounted on brackets 63 by usual rubber mountings 62 at the bracket end of the shock absorber and by bolt 61 at the piston end of the shock absorber. The actuation of the tightening and loosening or engaging and disengaging mechanism for the overload spring by control handle 44b is similar to that described in Fig. 1.

In Fig. 4 I have shown another form of the invention in which a portion only of the center section of the vehicle is shown, as was the case in Fig. 3. A transverse spring 50 carries a center yoke 50a which is attached by bolt 49 to piston rod 73 of hydraulic cylinder 70. In order to conserve length and get the minimum angle on the cables 22 and 23 that go to bell cranks, such as shown in Figs. 1 and 2, the cables preferably pass over the front end of the cylinder in saddles 71, rather than being attached at the rear end of cylinder 70. Flexible line 72 connects with the front end of the cylinder to retract the piston rod and is connected to line 41 which goes to the power steering unit or to other manual or power driven sources of fluid or air pressure. When it is desired to have any degree of overload, the cylinder is actuated to retract piston rod 73 thereby tightening cables 22 and 23 to make the overload spring 50 become more effective and take more and more load.

In Fig. 5 I have shown a portion of a vehicle with a different type of overload spring. In this case a tension coil spring 82 is secured to the frame of the vehicle cross member 10b by U-bolts 83 going around the coils of the spring nearest to the cross member 10b. Hydraulic cylinder 80 is nested inside the spring 82 and may preferably be separated therefrom by a hose-type sleeve 81 closely nesting the cylinder and preventing metallic contact between the cylinder and the coils of spring 82. The other end of coil spring 82 is secured to the head end of the cylinder, as by coil receiving threads 83a. Hydraulic line 41 is connected to the piston rod end of the cylinder 80 by flexible hose 84 so that when pressurized piston rod 85 will be retracted with pulley or saddle 86 to increase the tension on overload cables 22 and 23 which operate by being connected to bell cranks similar to the construction shown in Fig. 1. By this construction, when the pressure in line 41 is relaxed the piston rod 85 will be withdrawn from cylinder 80 to its elongated position so that cables 22 and 23 will be slack and the overload spring 82 will be substantially ineffective or at least ineffective except for the greatest compression of the normal supporting springs 7. As more overload is desired, pressure is put into line 41 which is preferably held by a check valve in a given position so that the full amount of overload support is provided when piston rod 85 is fully retracted and spring 82 is then connected to cables 22 and 23 with the minimum length of piston rod in between for the maximum overload effect.

In Figs. 6 and 7 I have shown an alternate method of transferring the up and down motion of the vehicle axle or wheel supporting structure into the cables which go to the various types of springs, as shown in Figs. 1 through 5. In this construction a pulley 92 is mounted at the end of Y bracket 90 which is secured at the right side of the car by U-bolts 90a to the frame 10 and bracket 91 is secured to the left side of the car frame by U-bolts 91a. A diagonal brace on these Y supports may be necessary, in which case brace 93 could go from bracket 90 to cross member 10b and brace 94 could go from Y member 91 to cross member 10b. Cable 95 is secured at its end to extension 97 which rides above axle 8 so that in the lowermost position of axle 8 the top of extension 97 will not be below pulley 92. In the similar manner, extension 98 is on the left hand side of the axle 8 and supports cable 96, so that the end which is attached to extension 98 does not ever go below left hand pulley 92. Cables 95 and 96 are similar in action to cables 22 and 23 and can be connected to any type of overload spring, such as those described in connection with the construction shown in Figs. 1 through 5. Extension 98 may be of a type which rides over the top of axle 8 and has its lower end attached to one of the U-bolt nuts, such as 99, and has two straps with the ends riding over the cable support 98 and secured by a clamp, as shown at 100.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In combination, a motor vehicle having a vehicle body, a pair of rear wheels, supporting structure for said rear wheels, resilient means between said wheels and said body, said resilient means normally supporting one end of said body, auxiliary resilient means attached to said supporting structure by flexible means, means controllable from the vehicle interior for tightening or loosening said flexible means to render said auxiliary resilient means more or less effective, said means controllable from the vehicle interior including a wire cable passing over a pulley to act on said flexible means.

2. In combination, a motor vehicle having a vehicle body, a pair of rear wheels, supporting structure for said rear wheels, resilient means between said wheels and said body, said resilient means normally supporting one end of said body, auxiliary resilient means attached to said supporting structure by a pair of flexible means, and means controllable from the vehicle interior for tightening or loosening said flexible means to render said auxiliary resilient means more or less effective, said auxiliary resilient means being attached to said vehicle body and adapted to move fore and aft when acting as an auxiliary, one said flexible means going from the supporting structure at each said rear wheel to said auxiliary resilient means, said flexible means being connected for movement together to said auxiliary resilient means to provide sway stabilizing means for said body.

3. In a wheeled vehicle, the combination of a vehicle frame; a pair of wheels with supporting structure therefor; a resilient means for each wheel, supported between said frame and said supporting structure; a single auxiliary spring means; and means for placing said single auxiliary spring means in varying degrees of effectiveness between said frame and said supporting structures for both of said wheels of said pair of wheels, said placing means includes cables operatively connected between said supporting structure and said auxiliary spring means, the ends of said cables being secured for movement together at said single auxiliary spring means, to provide sway stabilization that varies with the effectiveness of said single auxiliary spring means.

4. The vehicle of claim 3, in which said vehicle has a body and in which said placing means also includes means controlled from inside said body for loosening and tightening said cable means.

5. The vehicle of claim 4, wherein said cable means passes over pulley means adjacent said auxiliary spring means and are secured together at their ends.

6. In a motor vehicle, the combination of a vehicle frame; a body, supported by said frame; a pair of rear wheels, with supporting structure therefor; a pair of resilient means, one between each rear wheel and said frame; auxiliary resilient means supported by said frame; connecting means each operatively secured at one end to the supporting structure for one rear wheel and operatively connected at its other end to said auxiliary resilient means; both manual-mechanical and hydraulic control means for tightening and loosening said connecting means for changing the effectiveness of said auxiliary resilient means, said manual-mechanical control means being operable separately or in conjunction with said hydraulic control means, which is also operable separately.

7. In combination, a motor vehicle having a vehicle body, a pair of rear wheels, supporting structure for said rear wheels, resilient means between said wheels and said body, said resilient means normally supporting one end of said body, flexible connecting means attached to said supporting structure, auxiliary resilient means including a coil spring, a hydraulic cylinder, a piston in said cylinder with an actuating rod secured to one end of said coil spring, and adapted upon actuation of said cylinder to compress or relax said coil spring, means connecting said flexible connecting means and said auxiliary resilient means so that said coil spring carries a substantial overload through said rear wheels when said cylinder actuating rod is at one end of its travel and a greatly reduced overload when said cylinder is at the other end of said travel, and means controllable from the vehicle interior for actuating said cylinder to vary its compression, tightening or loosening said flexible means to render said auxiliary resilient means more or less effective.

8. In combination, a vehicle having a body, two rear wheels, main resilient means for supporting part of said body on said rear wheels, a main shock absorber between each of said wheels and said body, an auxiliary overload resilient means, an auxiliary shock absorber, associated with said overload resilient means, and manual means operable from the vehicle interior for increasing or decreasing the load carried by said overload resilient means and for simultaneously making said shock absorber more or less effective in snubbing action of said rear wheels to a degree related to the load carried by said overload resilient means.

9. In combination, a motor vehicle having a vehicle body, a pair of rear wheels, supporting structure for said rear wheels, main resilient means between said wheels and said body, said main resilient means normally supporting one end of said body, flexible connecting means attached to said supporting structure adjacent each rear wheel, an element pivoted to said body for motion in a plane substantially parallel with the ground on which said vehicle rests, auxiliary resilient means attached to said flexible connecting means and supplementing said main resilient means, said pivoted element being connected to said auxiliary resilient means by said flexible connecting means and serving to tighten or loosen the pull of said flexible means on said auxiliary resilient means to render said auxiliary resilient means more or less effective, and controllable from the vehicle interior for moving said pivoted element to effectuate control of the effectiveness of said auxiliary resilient means.

10. In combination, a motor vehicle having a vehicle frame with a cross member, a pair of rear wheels rearward of said frame cross member, supporting structure for said rear wheels, resilient means between said wheels and said body, said resilient means normally supporting one end of said body, auxiliary resilient means attached to said supporting structure by flexible means, said auxiliary resilient means being supported by and acting through said cross member in exerting its auxiliary support, and means controllable from the vehicle interior for tightening or loosening the pull of said flexible means on said auxiliary resilient means to render said auxiliary resilient means more or less effective.

11. In combination, a motor vehicle having a pair of rear wheels and a frame for said vehicle with a cross member forward of said rear wheels, supporting structure for said rear wheels, resilient means between said wheels and said frame, said resilient means normally supporting one end of said frame, flexible means attached to said supporting structure, a single coil spring mounted on one end to said cross member in a horizontal position of action, and attached at its other end to said flexible means, and means controllable from the vehicle interior for tightening or loosening said flexible means to render said coil spring more or less effective, said single coil spring acting as a sway stabilizer for both said rear wheels as well as a variable overload spring for both said rear wheels.

12. In combination, a motor vehicle having a vehicle body, a pair of rear wheels, supporting structure for said rear wheels, resilient means between said wheels and said body, said resilient means normally supporting one end of said body, bell cranks pivoted to said body, one end of each of said bell cranks being linked to one of said rear wheels, auxiliary resilient means attached to the other ends of said bell cranks by flexible means, and manually operable means controllable from the vehicle interior for varying the length of said flexible means between said bell cranks and said auxiliary resilient means to render said auxiliary resilient means more or less effective.

13. In combination, a motor vehicle having a vehicle body, a pair of rear wheels, supporting structure for said rear wheels, resilient means between said wheels and said body, said resilient means normally supporting one end of said body, auxiliary resilient means, and bell cranks pivoted to said body, one end of each of said bell cranks being linked to one of said rear wheels, the other ends of said bell cranks being connected to said auxiliary resilient means, and manually operable means for varying the effectiveness of said auxiliary resilient means in acting on said bell cranks for a given portion of said bell crank movement, said manually operable means being controllable from the vehicle interior.

14. In a motor vehicle, the combination of a vehicle frame; a pair of rear wheels, with supporting structure therefor; a pair of main resilient means, one between each said rear wheel and said frame; auxiliary resilient means supported by said frame; two connectors one for each said rear wheel each operatively secured at one end to the supporting structure for its rear wheel and operatively connected at its other end to the same said auxiliary resilient means; and manual-mechanical control means for tightening and loosening both said connectors simultaneously for changing the effectiveness of said auxiliary resilient means.

15. In a motor vehicle, the combination of: a vehicle frame; a pair of rear wheels, one on each side of the frame, with supporting structure therefor; a pair of resilient means, one between said supporting structure and said frame at each said rear wheel; auxiliary resilient means supported by said frame; two cable means, one for each wheel, each said cable means having a first end operatively connected to the supporting structure adjacent its said wheel and a second end operatively connected to said auxiliary resilient means, said second ends of said two cable means being attached together for movement together, so that said auxiliary resilient means acts not only as an auxiliary frame suspension but also as a sway stabilizer for said frame; and means for tightening and loosening both said cable means simultaneously for changing the effectiveness of said auxiliary resilient means.

References Cited in the file of this patent

UNITED STATES PATENTS

| | | |
|---|---|---|
| 971,475 | Rennen | Sept. 27, 1910 |
| 1,042,320 | Chapman | Oct. 22, 1912 |
| 1,379,836 | Rackham | May 31, 1921 |
| 1,623,081 | Amende | Apr. 5, 1927 |
| 1,703,323 | Sanford | Feb. 26, 1929 |
| 1,767,750 | Fisher | June 24, 1931 |
| 1,978,498 | Littman | Oct. 30, 1934 |
| 2,443,433 | Sanmori | June 15, 1948 |
| 2,518,733 | Walker | Aug. 15, 1950 |
| 2,762,633 | Gouirand | Sept. 11, 1956 |